(12) United States Patent  
Czirr (10) Patent No.: US 7,804,072 B2  
(45) Date of Patent: Sep. 28, 2010

(54) HETEROGENEOUS CAPTURE-GATED NEUTRON SPECTROMETER

(76) Inventor: J. Bart Czirr, 1830 E. 400 North, Mapleton, UT (US) 84664

( * ) Notice: Subject to any disclaimer, the term of this patent is extended or adjusted under 35 U.S.C. 154(b) by 40 days.

(21) Appl. No.: 12/348,224

(22) Filed: Jan. 2, 2009

(65) Prior Publication Data

US 2009/0166549 A1    Jul. 2, 2009

Related U.S. Application Data

(60) Provisional application No. 61/009,883, filed on Jan. 2, 2008.

(51) Int. Cl.
*G01T 3/06* (2006.01)
(52) U.S. Cl. .................... 250/390.11; 250/390.07
(58) Field of Classification Search ............ 250/390.07, 250/390.11
See application file for complete search history.

(56) References Cited

U.S. PATENT DOCUMENTS

| | | | |
|---|---|---|---|
| 4,931,649 A | 6/1990 | Czirr et al. | |
| 5,231,290 A | 7/1993 | Czirr et al. | |
| 5,420,959 A | 5/1995 | Walker et al. | |
| 6,011,266 A * | 1/2000 | Bell .................... | 250/390.01 |
| 6,924,487 B2 | 8/2005 | Bolozdynya et al. | |
| 7,141,799 B1 | 11/2006 | Neal et al. | |
| 7,205,535 B2 | 4/2007 | Madigan et al. | |
| 7,288,771 B2 | 10/2007 | Neal at al. | |
| 2004/0099810 A1 | 5/2004 | Gerstenmayer | |
| 2005/0023479 A1 | 2/2005 | Grodzins | |
| 2005/0135535 A1 | 6/2005 | Wallace | |
| 2006/0054863 A1 | 3/2006 | Dai et al. | |
| 2007/0069146 A1 | 3/2007 | Neal et al. | |
| 2007/0228284 A1 * | 10/2007 | Polichar et al. ......... | 250/390.11 |
| 2007/0272874 A1 * | 11/2007 | Grodzins ............... | 250/390.11 |
| 2008/0067394 A1 * | 3/2008 | Feller et al. ............ | 250/390.01 |

FOREIGN PATENT DOCUMENTS

WO    WO 2007/139915    12/2007

OTHER PUBLICATIONS

Sorma West 2008, Symposium on Radiation Measurements and Applications, Jun. 2-5, 2008, 95 pages, Berkeley, California, USA.

(Continued)

*Primary Examiner*—David P Porta
*Assistant Examiner*—Jessica L Eley
(74) *Attorney, Agent, or Firm*—Thorpe North & Western LLP (57) ABSTRACT

A system and method for a heterogeneous capture-gated neutron detector are disclosed. The system includes an inorganic hydrogenous scintillating layer configured to emit at least one collision photon when contacted with a neutron having an energy greater than a predetermined value. A neutron capture layer is located adjacent the inorganic or organic hydrogenous scintillating layer and configured to capture the neutron and emit at least one gamma ray. The inorganic or organic hydrogenous scintillating layer is further configured to emit at least one capture photon in response to the at least one gamma ray from the neutron capture layer. Detection of the collision photon and capture photon designate a detected and captured neutron.

24 Claims, 4 Drawing Sheets

OTHER PUBLICATIONS

Drexlin et al., "The high resolution neutrino calorimeter karmen," Nuclear Instruments and Methods in Physics Research A289 (1990) 490-495.

Lightfoot et al., "Development of a gadolinium-loaded liquid scintillator for solar neutrino detection and neutron measurements," Nuclear Instruments and Methods in Physics research A 522 (2004) 439-446.

Jahnke et al., "A combination of two 4π detectors for neutrons and charged particles" Part I. The Berlin neutron ball—a neutron multiplicity meter and a reaction detector, Nuclear Instruments and Methods in Physics research A 508 (2003) 5 pages.

Apollonio et al., "Initial results from the CHOOZ long baseline reactor neutrino oscillation experiment," Physics Letters B 420 (1998) 5 pages.

Wilcox, "Novel Beytrib Detector for n-n Scattering Length," a thesis for the degree of Master of Science, BYU, Aug. 2005, pp. 12-14.

Czirr et al., "Capture-gated Neutron Spectrometry," Nuclear Instruments and Methods in Physics Research, A, 2002, vol. 476, pp. 309-312.

Marion, J.B. et al., "Fast Neutron Physics", Part, I, 1960, 5 pages submitted, Interscience Publishers, Inc.

Drake et al., "New electronically black neutron detectors," Nuclear Instruments and Methods in Physics Research A247, 1986, pp. 576-582.

Wilcox, Eva, "Novel Detector for n-n Scattering Length Measurement," Thesis BYU, Aug. 2005.

Kim, C., et al., "Characteristics of Hybrid Plastic Scintillators for Slow Neutron Measurements," 2007 IEEE Nuclear Science Symposium Conference Record, N34-2, pp. 1971-1975.

Czirr, J. B., "Gd-loaded plastic scintillator" Nuclear instruments and methods, 1973, pp. 613, vol. 108, North-Holland Publishing Co.

Czirr, J. Bart, et al., "A compact neutron coincidence spectrometer its measured response functions* and potential applications," Nuclear Instruments and Methods in Physic Research, Mar. 22, 1994, pp. 532-539.

Czirr, J. Bart, et al., "A neutron coincidence spectrometer," Jun. 7, 1989, pp. 365-369, vol. A284, North-Holland Physics Publishing Division.

Jensen, Gary L., et al., "High efficiency fast-neutron detectors," Nuclear Instruments and Methods in Physics Research, Dec. 22, 1993, pp. 474-483, vol. A 333.

Jensen, Gary L. et al., "A moderating 6Li-Glass Neutron Detector," Nuclear Instruments and Methods in Physics Research, 1984, pp. 406-408, vol. 220.

* cited by examiner

HETEROGENEOUS CAPTURE-GATED NEUTRON SPECTROMETER

CROSS-REFERENCE TO RELATED APPLICATION AND CLAIM OF PRIORITY

Priority of U.S. Provisional patent application Ser. No. 61/009,883 filed on Jan. 2, 2008 is claimed and is hereby incorporated by reference.

BACKGROUND

Neutron detectors are used in a variety of applications, such as particle physics experiments, instrumentation at nuclear reactors, radiation safety, cosmic ray detection, and border security. Accurate detection of neutrons and their corresponding kinetic energy can be difficult since neutrons have no charge. This makes it difficult to direct neutrons toward a detector to facilitate detection. Neutrons also do not ionize atoms directly, so gaseous ionization detectors are usually ineffective. Additionally, there is typically a relatively high level of background noise. The main component of background noise in neutron detection is high-energy photons. It can be difficult to determine in certain types of detectors whether neutrons or photons are being detected. Both register similar signals after interacting in the detector.

Homogenous capture-gated neutron spectrometers have been utilized for several years. Homogeneous detectors are composed of a single, uniform mixture of appropriate chemicals that include a hydrogenous scintillator and a high-capture-cross-section component that provides the neutron-capture signal. A typical capture material consists of boron enriched in the B-10 isotope.

Heterogeneous capture-gated neutron spectrometers offer several advantages over the homogeneous class of spectrometers. However, heterogeneous detectors are typically composed of relatively expensive materials. A typical heterogeneous detector contains two or more separate materials placed in intimate contact with each other, forming a single, optically transparent body. Characteristic capturing materials may include Li-6, B-10, or both types of nuclei. For example, current detectors can include thick sheets of plastic scintillator interspersed with relatively thin sheets of lithium-glass scintillator, with the lithium enriched in the Li-6 isotope. This type of heterogeneous detector requires an efficient scintillator that incorporates the capturing nuclei, since the capture byproducts of the Li-6 or B-10 isotopes are heavy, short-range charged particles such as tritons and alpha particles that do not escape the capturing scintillator. This type of scintillator can be quite expensive, thereby increasing the overall cost of the detector.

The above factors have limited the use of neutron detectors to small, niche markets. A relatively small, inexpensive neutron detector can create new markets for neutron detectors in medicine, nuclear science, and homeland security.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

In accordance with one embodiment of the present invention, a system and method for detection of neutrons using a heterogeneous capture-gated neutron spectrometer system is disclosed. The system is capable of or facilitates coincidence detection of neutrons using a hydrogenous scintillating material located adjacent to a neutron capture layer. The scintillating layer and capture layer can be in close proximity. The neutron capture layer is comprised of a material selected based on the material's ability to capture neutrons and emit gamma ray photons.

A neutron contacting the detector will lose a substantial amount of its kinetic energy through interaction with the nuclei in the scintillating material. For example, a neutron having a kinetic energy of 1 mega-electron-volt (MeV) that enters the scintillating material may collide several (e.g. ten to twelve) times within the material. Each time the neutron collides with a carbon or hydrogen nucleus, energy is transferred from the neutron to a proton or nucleus. These charged particles are capable of exciting or ionizing the molecules of the scintillating materials, which then emit visible or detectable photons. These photons are referred to as collision photons since they are related to the collision of the neutron with the nuclei in the scintillating layer. The collision photon can be in the visible spectrum at a wavelength of around 400 nm, though the actual wavelength depends on the type of scintillating material used. Different types of scintillating materials can produce collision photons in the infrared, visible, or ultraviolet portion of the spectrum. The photons can then be detected and converted to an electrical signal, which may be referred to as a kinetic energy signal since the number of collision photons released is typically proportional to the original kinetic energy of the neutron prior to entering the scintillating material.

Eventually, sufficient energy is absorbed within the scintillating material that photons are no longer emitted. The length of time for the kinetic energy of the neutron to be reduced to the point where photons are no longer emitted due to collisions of the neutron with the nuclei in the scintillating material is about 50 nanoseconds (ns). The neutron may continue to diffuse through the scintillating material for several microseconds until its energy is approximately equal to the thermal energy of the detector. After the kinetic energy of the neutron has been sufficiently reduced, the neutron can be captured by the neutron capture layer.

The neutron capture layer is typically comprised of a material having a large thermal neutron capture cross-section, thereby making the material capable of absorbing the neutron and emitting gamma rays. Exemplary materials include cadmium, gadolinium, samarium, and europium. Gadolinium is often used in various types of neutron detectors due to its large neutron capture cross section area of approximately 49,000 barns. A barn is a unit of area. A barn is defined as being $10^{-24}$ $cm^2$, and corresponds approximately to the cross sectional area of a uranium nucleus. Gadolinium has the highest cross-section area after xenon-135. However, gadolinium is also relatively expensive.

It has been discovered that materials with a significantly lower cross-sectional area, can be used to detect neutrons in a heterogeneous capture-gated neutron detector with a nearly equivalent efficiency as the much more expensive gadolinium. For example, it was discovered that cadmium, with a neutron cross sectional area of approximately 2,500 barns, can be used in the heterogeneous capture-gated neutron spectrometer system with nearly the same efficiency in detecting neutrons as with gadolinium. Cadmium is almost as effective as gadolinium for capturing low energy neutrons in a well moderated neutron flux, in spite of a capture cross-section that is smaller than the cross-section of gadolinium by almost a factor of 20. Because of the relatively lower cost and availability of cadmium, its use in the neutron capture layer may be preferred in many applications.

When a neutron has been sufficiently slowed and captured in the neutron capture layer, energy is released in the form of gamma ray photons. For example, when using cadmium as the neutron capture layer, a plurality of gamma rays are released with a total energy of approximately 9 MeV. There are typically about 9 gamma rays that are released. The gamma rays then travel into the scintillating material and interact with the electrons in the scintillating layer. The interaction of the gamma rays with the electrons in the scintillating layer results in energetic electrons which can excite or ionize the scintillator. This causes a plurality of photons to be emitted. The resulting photons are referred to as capture photons since they are associated with the capture of the neutron. The capture photons are typically in the visible spectrum with a wavelength around 400 nm, although the exact wavelength is dependent on the type of material used in the scintillating layer and may include wavelengths in the infrared, visible, and ultraviolet portions of the electromagnetic spectrum. The photons can be detected and converted to an electrical signal, which may be referred to as the capture signal. A capture-gated neutron detector is a detector capable of producing a capture signal and a kinetic energy signal in response to a neutron.

The overall time it takes for a neutron to be captured in the neutron capture layer is dependent on a number of variables, such as the original energy of the neutron, and the number and types of nuclei that the neutron interacts with in the detector head. The actual amount of time may vary from less than a microsecond to longer than 30 microseconds. The mean capture time for a neutron in a cadmium neutron capture layer adjacent a 1 cm thick plastic scintillator layer is approximately 10 microseconds (μs), with an exponential falloff before and after this time.

The total amount of kinetic energy of the neutron can be estimated based on the number of photons given off when the neutron enters the scintillating material and interacts with the nuclei in the scintillating material. In order to provide an accurate estimate, there must be some assurance that the neutron did not enter the scintillating material, interact with one or more nuclei to produce collision photons, and then exit the detector before coming to a stop. When the neutron capture signal is received, it verifies that the neutron did not exit the detector and, therefore, its kinetic energy can be estimated based on the number of collision photons. When thousands or millions of neutrons are detected, a correlation between each neutron's entry into the scintillating material and their capture can be made by measuring the time period between the kinetic energy signal and the neutron capture signal for each neutron.

It can be determined that the neutron was captured within the detector and that the kinetic energy signal has a high probability of accurately representing the neutron's kinetic energy prior to the neutron entering the scintillating material when the time period between the signals is less than a certain amount. For example, when a capture signal occurs less than 40 microseconds from the kinetic energy signal, the two signals can be correlated as the detection and capture of a neutron.

Figure 1A:
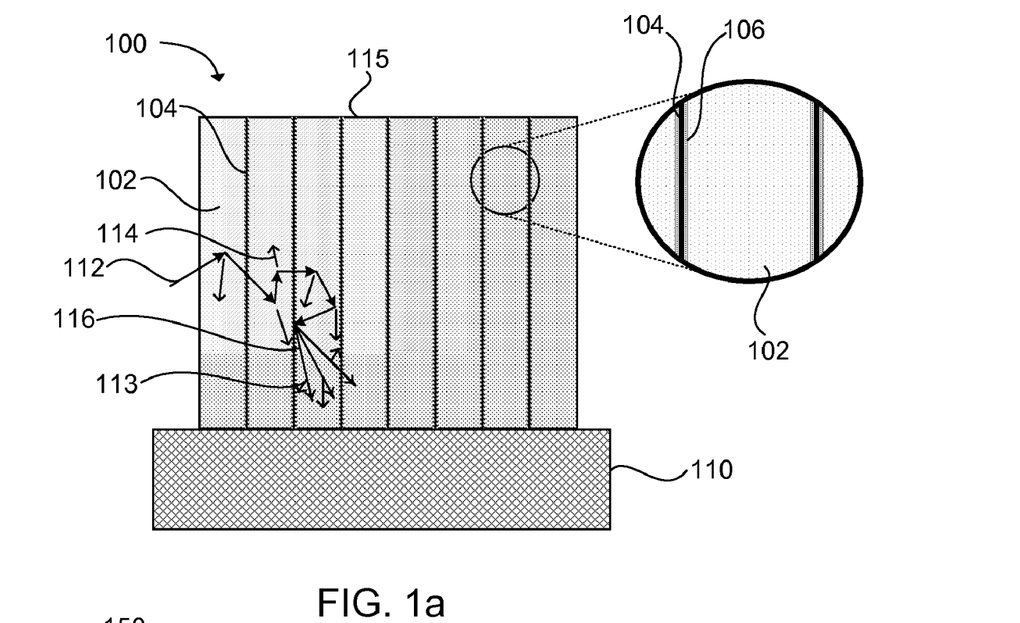
FIG. 1a is an illustration of a cross section of an exemplary heterogeneous capture gated detector head in accordance with an embodiment of the present invention.

FIG. 1a provides an illustration of a cross section 100 of an exemplary heterogeneous capture gated detector head in accordance with an embodiment of the present invention. The detector head 100 includes at least one organic hydrogenous scintillating layer 102. The scintillating layer may be formed of an organic crystal material, an organic liquid, a plastic material, or another type of scintillator. Organic scintillators are aromatic hydrocarbon compounds containing linked or condensed benzene-ring structures. Crystals can be formed of materials such as anthracene, stilbene and napthalene. Liquid organics such as toluene, xylene, benzene, phenylcyclohexane, triethylbenzene, and decaline can be used. Mineral oils can also be used as the solvent for a liquid scintillator. Alternatively, the scintillating layers 102 may be formed using a polymer, such as polyvinyl toluene doped with terphenyl.

A scintillating layer formed of a high-Z material, such as an inorganic crystal can provide efficient detection of gamma rays. However, inorganic crystals typically do not contain hydrogen. A large percentage of the collision photons are created through the interaction of the neutrons with the hydrogen nuclei in the scintillating material. Therefore, inorganic crystals with little or no hydrogen can substantially reduce the ability to produce collision photons, thereby significantly decreasing the kinetic energy signal. Since one of the main purposes of the heterogeneous capture-gated neutron detector is to determine the kinetic energy of the neutrons, it is typically impractical to construct the scintillating layer with an inorganic crystal having low hydrogen content, however, an inorganic crystal having an adequate hydrogen content would be practical for use in constructing a scintillating layer.

The width of each of the scintillating layers is dependent on the type of material(s) from which the scintillator is constructed. If the scintillating layer is too thin, it reduces the probability that a neutron will be slowed sufficiently for capture. However, if the scintillating layer is too thick, it lengthens the time and reduces the probability that the neutron will migrate through the scintillating layer to the neutron capture layer. In one embodiment, a plastic scintillator such as polyvinyl toluene can be used having an average thickness of approximately 1 centimeter (cm). A typical width of the scintillating layer is between 0.1 cm and 10 cm. However, widths outside this limit are considered to be within the scope of the invention.

The neutron capture layer 104 can be located adjacent the scintillating layer 102. As previously discussed, the neutron capture layer can be formed of a material having a large thermal neutron capture cross-section, such as cadmium, gadolinium, samarium, and europium. In one embodiment, the neutron capture layer can be comprised of a cadmium foil having an average width of approximately 0.1 millimeters (mm). The actual width of the neutron capture layer depends on the type of material used to form the layer. The neutron capture layer will typically have a width (thickness) between 0.01 mm and 5.0 mm. However, widths outside this limit are considered to be within the scope of the invention.

The neutron capture layer 104, such as the cadmium foil, can be coated with a reflective coating 106 that facilitates reflection of the collision photons and the capture photons to direct the photons to a photon detection device 110. The reflective coating can be comprised of silver, aluminum, aluminized Mylar®, or other types of coating that are highly reflective (greater than 99%) at the wavelengths of the collision and capture photons. The scintillating layer 102 can be formed of a material that is substantially transparent at the wavelength of the photons emitted by the scintillator. This enables the collision photons and capture photons to travel through the scintillating layers between the neutron capture layers to enable detection of the photons by the photon detection device 110.

The photon detection device 110 is configured to receive the collision photons and the capture photons and convert the signals to an electrical signal proportional to the intensity of the photons. The photon detection device can be a photomultiplier tube (PMT), a photo diode, an avalanche photo diode, a charge integration photon detector, or another type of photon detection device capable of detecting the collision and capture photons and converting them to an electrical signal proportional to the intensity of the photons.

In one example, a neutron 112 is represented by arrows with closed triangular endings representing the neutrons path. The neutron can enter the detector head 100 at a random angle based on the neutrons flight path. The neutron will undergo several collisions with nuclei in the scintillating layer, such as carbon nuclei or protons. The neutron may pass through several scintillating layers and neutron capture layers. Each collision with nuclei can redirect the neutron in a different direction. Additionally, each collision can result in the production of one or more collision photons 114. The collision photons in this example are represented by arrows with straight, open ends. A number of collisions will occur, depending on such variables as the amount of kinetic energy of the neutron prior to entering the detector head, the angle at which the neutron collides with nuclei inside the layers, and so forth. A percentage of the resulting collision photons are directed by the reflective layers 106 on the neutron capture layers 104 towards the photon detection device 110.

Once the neutron slows sufficiently, the neutron can migrate towards one of the neutron capture layers 104. When the neutron is captured by one of the atoms in the neutron capture layer, the atom will output a plurality of gamma rays 116, represented by arrows with curved, open ends. The gamma rays then interact with electrons in the scintillating layers 102. Collisions between the gamma rays and the electrons result in the output of capture photons 113. The capture photons are represented by arrows with open, straight ends. A percentage of the capture photons will be directed towards the photon detection device 110 by the reflective layers 106. A reflective layer can be used on the outer edges 115, such as the top and sides of the neutron detector head 100 to reflect photons at the edges towards the photon detection device.

The kinetic energy of the neutron prior to its interaction with the neutron detector head 100 can be determined by the number of the collision photons detected at the photon detection device 110. The detector head and photon detection device can be calibrated to enable the kinetic energy signal to accurately represent a neutron's kinetic energy.

A user can be ensured that the neutron 112 did not escape the detector head 100 by the detection of the capture photons 113 at the photon detection device 110. This ensures that the amplitude of the detected collision photons represents the total kinetic energy of the neutron, and not merely a portion of the neutron's energy that is detected before the neutron leaks out of the detector head. If no capture photons are detected within a prescribed amount of time after the collision photons are detected, then it can be assumed that the neutron escaped. Experiments show that approximately 90 percent of the captures occur within 15 microseconds. The probability of neutrons captured after this period decays exponentially. It can be assumed that if no capture photons are detected in a period of 30 to 40 microseconds after a detection of the collision photons, that the neutron escaped the detector head. Therefore, the kinetic energy of the escaped neutron cannot be accurately determined in these cases.

Figure 1B:
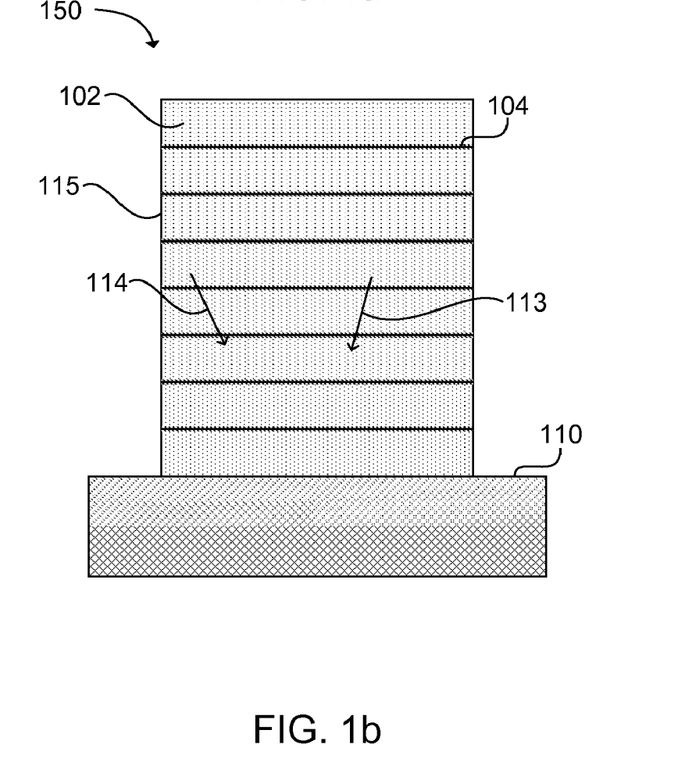
FIG. 1b illustrates a cross section of a heterogeneous capture gated detector head having horizontal layers in accordance with an embodiment of the present invention.

In an alternative embodiment, illustrated in FIG. 1b, the neutron capture layer(s) 104 of a neutron detector head 150 can be formed of crystals that are substantially transparent at the wavelength of the collision photons and capture photons. The crystals can also be chosen to have an index of refraction at that photons wavelength that is close to that of the scintillating layer(s) 102 to minimize beam attenuation that occurs as the photons pass through the neutron capture layers 104 and the scintillating layers 102. Examples of crystals that can be used as a neutron capture layer include gadolinium trifluoride, gadolinium trichloride, gadolinium sulfate, cadmium fluoride, cadmium chloride, and cadmium sulfate.

The use of substantially transparent neutron capture layer(s) 104 and scintillating layer(s) 102 enables the scintillating layers and neutron capture layers to be stacked horizontally, while still enabling the collision photons 114 and capture photons 113 to travel through the multiple layers to the photon detection device 110 with a low loss. A reflective layer can be used on the outer edges 115, such as the top, and sides of the neutron detector head 150 to reflect photons at the edges towards the photon detection device. The use of the substantially transparent neutron capture layer(s) may provide a lower loss path for the photons relative to the reflective surfaces of a non-transparent neutron capture layer, such as cadmium foil. Lower losses in the collision photons and capture photons can provide a more sensitive neutron detector.

Figure 2:
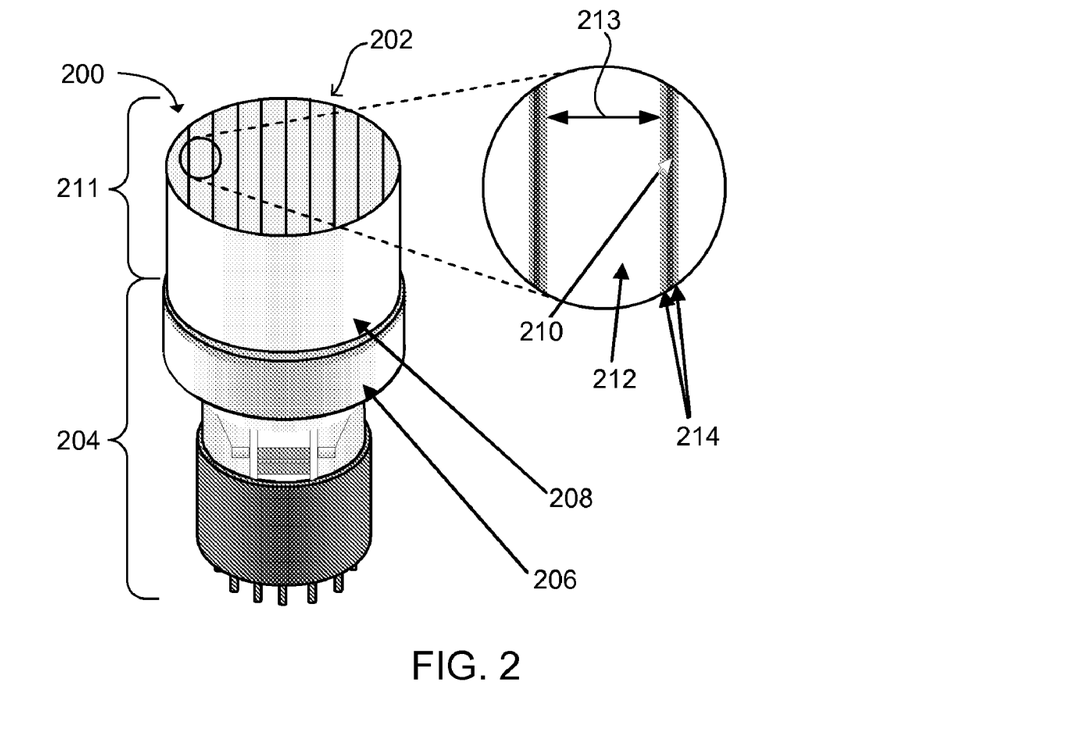
FIG. 2 illustrates an exemplary heterogeneous capture gated neutron spectrometer system in accordance with an embodiment of the present invention.

One embodiment of an exemplary heterogeneous capture gated neutron spectrometer system 200 is illustrated in FIG. 2. In this example, a neutron detector head 202 is formed having an identifiable shape, such as a cylindrical shape. The detector head has a height 211 of approximately 12.5 centimeters and a diameter of approximately 12.5 centimeters. Since neutrons cannot be directed, the overall volume of the detector head is more important than the shape. The shape of the detector head can be selected based on the type of photon detection device used to enable the collision photons and capture photons to be efficiently transferred from the detector head to the photon detection device.

The volume of the detector head 202 can be selected based on the kinetic energy of the neutrons that will be detected and the desired efficiency of the system. Neutrons with a greater kinetic energy will travel further through a detector head. A larger volume will reduce the number of neutrons that escape the detector head and increase the detection efficiency. A typical volume of the detector head can be between 0.5 liters and 100 liters, though volumes outside that range are considered to be within the scope of the present invention.

In the exemplary embodiment of FIG. 2, the detector head 202 is formed of alternating layers of a polyvinyl toluene based plastic scintillating material 212 having a width 213 of approximately 1 cm and a neutron capture layer 210 formed of 0.1 mm thick cadmium foil coated with a reflective material 214 formed of aluminized Mylar®. The scintillating layer can be constructed to emit collision photons for neutrons having kinetic energies of greater than 250 Kilo-electron Volts (KeV). A reflective enclosure 208 is used to enclose the alternating layers and hold them together. The enclosure has a reflective internal surface used to direct the collision photons and capture photons towards the photon detection device. The detector head 202 is sized to fit within a receiving sleeve 206 that is physically coupled to a standard 5-inch Burle "Teacup" model S83006E photo-multiplier tube 204.

Figure 3A:
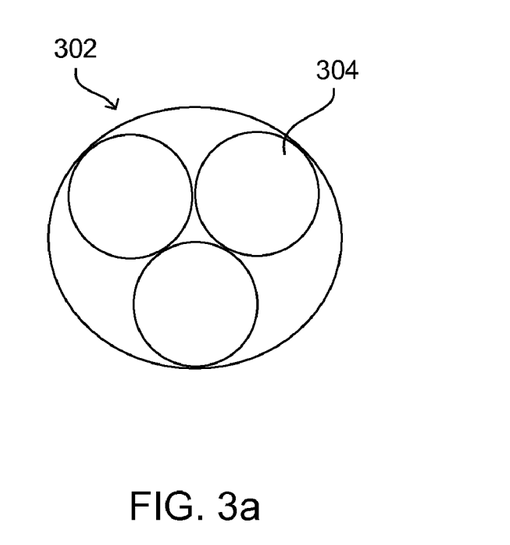
FIG. 3a illustrates a heterogeneous capture gated detector head coupled to three photon detection devices in accordance with an embodiment of the present invention.
Figure 3B:
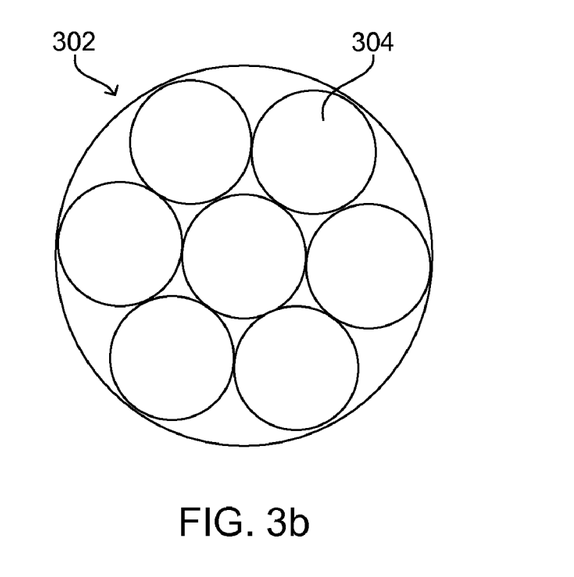
FIG. 3b illustrates a heterogeneous capture gated detector head coupled to seven photon detection devices in accordance with an embodiment of the present invention.

In one embodiment, a plurality of photon detection devices may be coupled to a single detector head. For example, a plurality of photo-multiplier tubes 304 can be coupled to one end of a single detector head 302, as illustrated in the block diagrams of FIGS. 3a and 3b. Alternatively, one or more photo-multiplier tubes or other types of photon detection devices may be coupled to both the top and bottom of a detector head, such as the detector head 202 illustrated in FIG. 2.

Photo-Multiplier Tubes (PMT) are limited in the amplitude of the signal that they can detect by the dark current generated by the PMT. Dark current is the current that flows through photosensitive devices when no light is present. The current is electrical noise caused by random fluctuations of electrons due to thermal energy. The dark current is substantially random. When detected photons result in signals that are less than the dark current, they typically cannot be read and are considered below the noise level.

To reduce the amount of dark current, coincidence can be demanded between two or more photon detection devices, such as the photo-multiplier tubes. By recording the collision photons and capture photons emitted from the detector head using multiple photon detection devices, the overall dark current can be reduced. This reduction in dark current noise enables accurate detection of smaller signals. Thus, the use of a plurality of photon detection devices can provide a more sensitive spectrometer system. A heterogeneous capture gated neutron spectrometer system can include 2, 3, 4, 5, 6, 7 or more photon detection devices coupled to a single detector head to increase the sensitivity and accuracy of detection and measurement of the collision photons and capture photons to form the kinetic energy signal and capture signal respectively. These signals can then be recorded and analyzed.

In one embodiment the heterogeneous capture gated neutron spectrometer system 200, as illustrated in one exemplary embodiment in FIG. 2, can be used to detect neutrons and provide a measurement of a captured neutron's kinetic energy prior to the neutron's interaction with the system. In order for this to occur, the kinetic energy of the neutron must have a kinetic energy sufficient to create collision photons in the scintillating material. However, in some instances, the detector head 202 may be used to measure neutron flux for neutrons having kinetic energies less than the amount needed to create collision photons in the scintillating material. In this embodiment, neutron flux can be determined based on the capture signal alone. That is, when there is no kinetic energy signal prior to a capture signal, it can be determined that a neutron was captured that had less kinetic energy than is needed to create collision photons in the scintillating material. In certain uses, an accurate measurement of neutron flux can be valuable.

Figure 4:
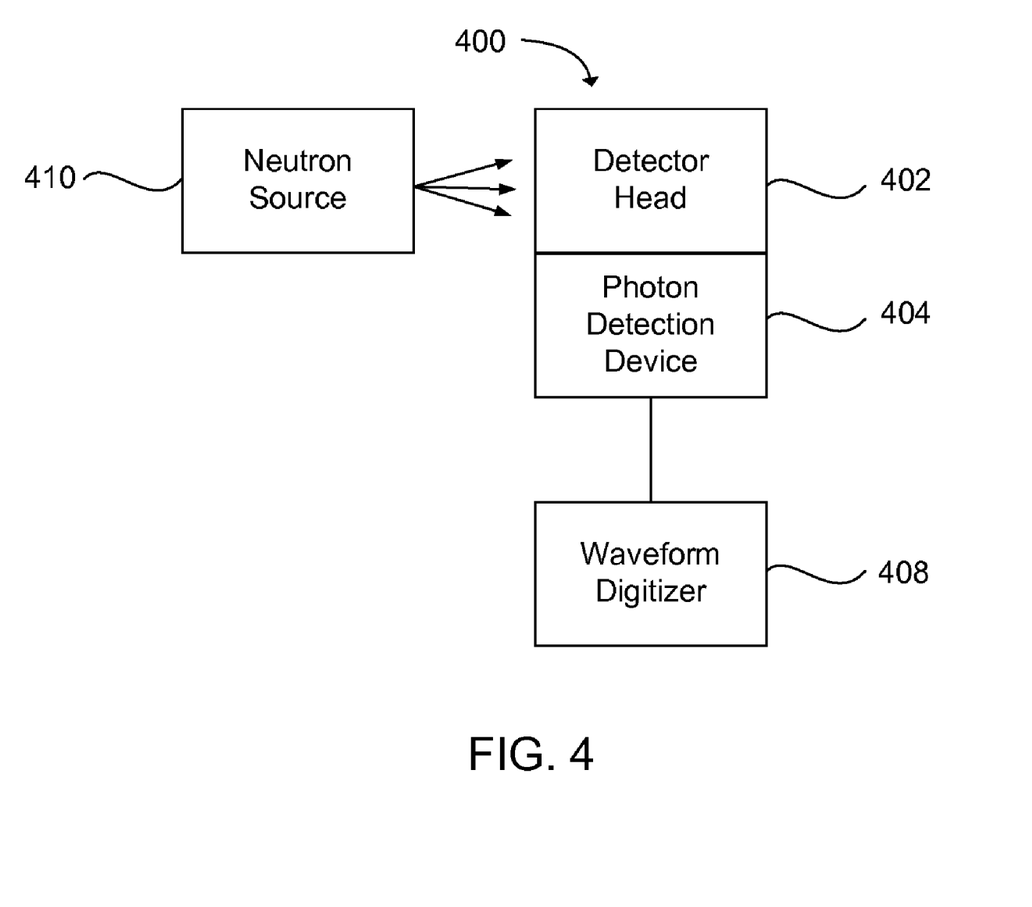
FIG. 4 illustrates a block diagram of a heterogeneous capture gated neutron spectrometer and detection system in accordance with an embodiment of the present invention.

A block diagram of a heterogeneous capture gated neutron spectrometer and detection system 400 is illustrated in FIG. 4. Neutrons are received from a neutron source 410 at the detector head 402. The neutron source may be a nuclear plant, a particle physics experiment, or a naturally occurring phenomenon and is not considered part of the system. Collision photons and capture photons are generated in the detector head when neutrons enter the scintillating layer and are then captured in the neutron capture layer, as previously discussed. These photons are detected using a photon detection device 404. The photon detection device is typically located adjacent the detector head to minimize transmission loss between the detector head and the photon detection device. However, in some instances it may be possible to couple the photons from the detector head to one or more photon detection device(s) using a low loss fiber optic waveguide or other type of optical waveguide.

A waveform digitizer 408 can be electrically connected to an output of one or more photon detection devices 404. The waveform digitizer can be used to record the kinetic energy signal and capture signal from the photon detection device for each neutron captured in the detector head 402. Since the slowing down time of neutrons having kinetic energy in the mega-electron Volt range is on the order of 50 nanoseconds, and the diffusion time before capture is on the order of microseconds, the two signals can be easily distinguished using the waveform digitizer. Therefore, two well separated pulses signify the capture of a neutron. A waveform digitizer operating at 250 MHz with 12 bits of pulse height resolution can be used to distinguish the kinetic energy signals from the capture signals. It can be appreciated that other types of waveform analyzers can also be used. Once the signals have been recorded, the signals can then be statistically analyzed to determine the number of neutrons captured and the kinetic energy of each of the captured neutrons. When kinetic energy signals appear that are not followed by a capture signal within a certain time period, then the kinetic energy signals can be categorized as a non-capture event.

Figure 5:
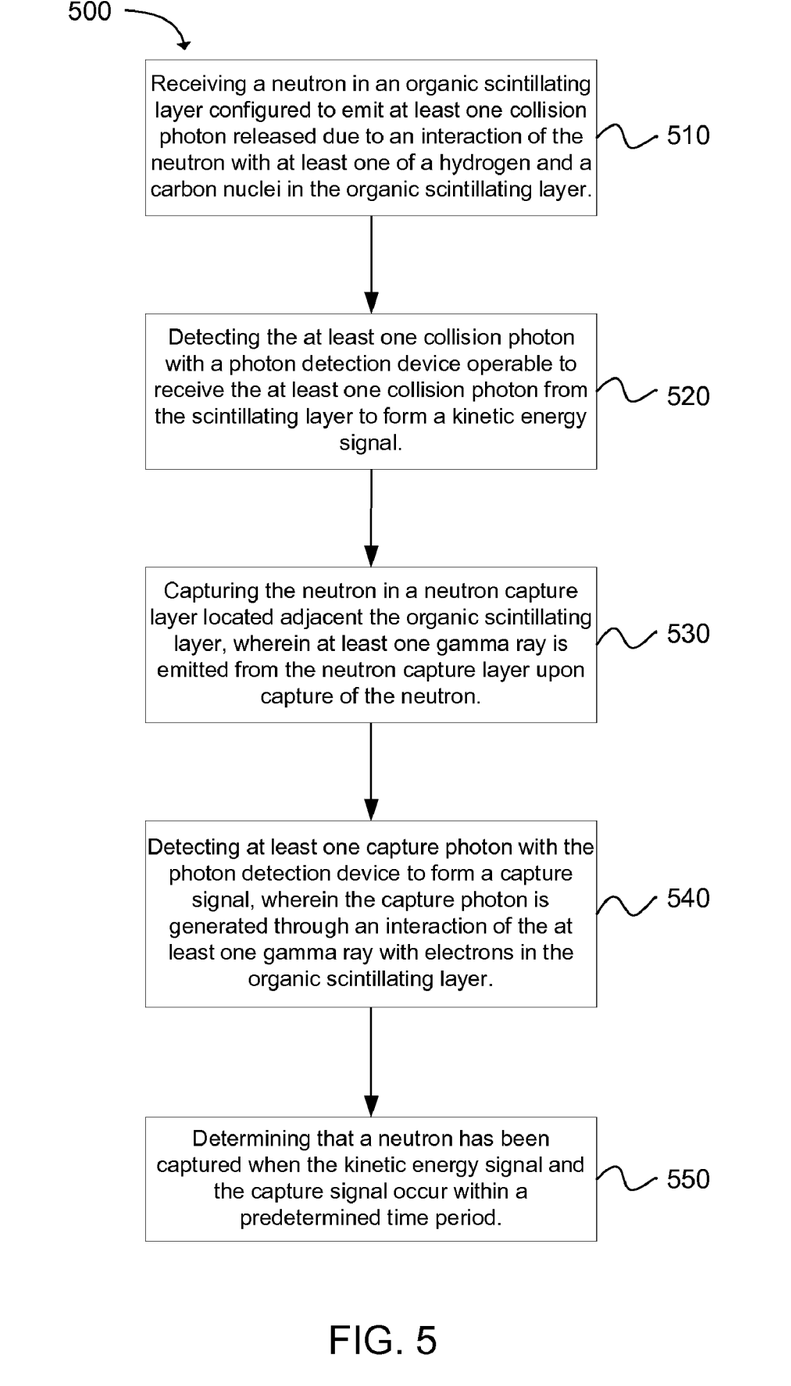
FIG. 5 depicts a flow chart illustrating a method for capturing and detecting neutrons in accordance with an embodiment of the present invention.

Another embodiment of the present invention provides a method 500 for capturing and detecting neutrons, as depicted in the flow chart of FIG. 5. The method includes the operation of receiving 510 a neutron in an organic scintillating layer configured to emit at least one collision photon released due to an interaction of the neutron with at least one of a hydrogen and a carbon nuclei in the organic scintillating layer. An additional operation includes detecting 520 the at least one collision photon with a photon detection device operable to receive the at least one collision photon from the scintillating layer to form a kinetic energy signal.

The method 500 further includes capturing 530 the neutron in a neutron capture layer located adjacent the organic scintillating layer, wherein at least one gamma ray is emitted from the neutron capture layer upon capture of the neutron. At least one capture photon is detected 540 with the photon detection device to form a capture signal, wherein the capture photon is generated through an interaction of the at least one gamma ray with electrons in the organic scintillating layer. It can then be determined 550 that a neutron has been captured when the kinetic energy signal and the capture signal occur within a predetermined time period.

Because of the nature of the dual signal output from the heterogeneous capture gated neutron spectrometer system for captured neutrons, the detector head is substantially less sensitive to background noise caused by incident gamma rays. Random gamma rays that are not caused by neutron capture, such as gamma rays caused by cosmic rays or nuclear decay, can be ignored since they typically will not be associated with a kinetic energy signal.

By utilizing penetrating gamma rays for neutron capture detection, the heterogeneous capture gated neutron detector eliminates the requirement of using an efficient scintillator incorporating the capturing nuclei since the gamma rays almost always escape the neutron capture layer and interact with the scintillating layers to produce the capture photons. In addition, with good index of refraction matching or good foil reflectivity, large quantities of scintillating material can be used without substantially degrading the optical transmission of the detector body, thereby increasing the overall detection efficiency.

The heterogeneous capture gated neutron detector provides a small, inexpensive, efficient means for capturing and detecting neutrons. The reduced size and cost of the detector can enable its use in new fields that previously were unable to afford neutron detectors.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A heterogeneous capture-gated neutron spectrometer system, comprising:
   a hydrogenous scintillating layer configured to emit at least one collision photon when contacted with a neutron having an energy greater than a predetermined value;
   a neutron capture layer located adjacent the hydrogenous scintillating layer and configured to capture the neutron and emit at least one gamma ray;
   the hydrogenous scintillating layer further configured to emit at least one capture photon in response to the at least one gamma ray from the neutron capture layer;
   a photon detection device operable to receive and detect the at least one collision photon and the at least one capture photon, wherein the successful capture of the neutron is determined based on a detection of the at least one collision photon and a detection of the at least one capture photon.

2. A system as in claim 1, wherein the successful capture of the neutron is determined based on an amount of time between the detection of the at least one collision photon and the detection of the at least one capture photon.

3. A system as in claim 1, wherein the photon detection device is operable to determine a kinetic energy of the neutron prior to contact with the hydrogenous scintillating layer based on a number of collision photons detected by the photon detection device.

4. A system as in claim 1, wherein the hydrogenous scintillating layer is operable to emit the at least one collision photon when interacting with a neutron having a kinetic energy greater than 250 KeV prior to interacting with the hydrogenous scintillating layer.

5. A system as in claim 1, wherein the hydrogenous scintillating layer is formed of at least one of a solid scintillating material, a crystal scintillating material, and a liquid scintillating material.

6. A system as in claim 1, wherein the neutron capture layer is comprised of a material selected from the group consisting of gadolinium, cadmium, samarium, europium, and any combination of these.

7. A system as in claim 1, wherein the neutron capture layer is comprised of at least one of a metallic foil and a transparent crystal.

8. A system as in claim 7, wherein the transparent crystal is comprised of a material selected from the group consisting of gadolinium trifluoride, gadolinium trichloride, gadolinium sulfate, cadmium fluoride, cadmium chloride, and cadmium sulfate, and any combination of these.

9. A system as in claim 7, wherein the metallic foil is further coated with a reflective coating that facilitates direction of the at least one collision photon and the at least one capture photon to the photon detection device.

10. A system as in claim 9, wherein the reflective coating is comprised of a material selected from the group consisting of silver, aluminum, and aluminized Mylar®.

11. A system as in claim 1, further comprising a plurality of alternating layers of the hydrogenous scintillating layer and the neutron capture layer.

12. A system as in claim 11, wherein the volume of the alternating layers is less than 100 liters.

13. A system as in claim 11, wherein the volume of the alternating layers is less than 10 liters.

14. A system as in claim 11, wherein each hydrogenous scintillating layer has a thickness between 0.1 centimeters and 10 centimeters.

15. A system as in claim 11, wherein each neutron capture layer has a thickness between 0.01 millimeters and 5 millimeters.

16. A system as in claim 1, wherein the photon detection device is selected from the group consisting of a photo-multiplier tube, an avalanche photo diode, a photo diode, and a charge integration photon detector.

17. A system as in claim 1, further comprising a plurality of photon detection devices operable to receive the at least one collision photon and the at least one capture photon and output a kinetic energy signal and a capture signal.

18. A system as in claim 1, further comprising a waveform digitizer configured to record an output of the photon detection device.

19. A system as in claim 1, wherein said hydrogenous scintillating layer comprises an organic hydrogenous scintillating layer.

20. A method for capturing and detecting neutrons, comprising:
   receiving a neutron in a hydrogenous scintillating layer configured to emit at least one collision photon released due to an interaction of the neutron with a hydrogen nucleus in the hydrogenous scintillating layer;
   detecting the at least one collision photon with a photon detection device operable to receive the at least one collision photon from the hydrogenous scintillating layer to form a kinetic energy signal;
   capturing the neutron in a neutron capture layer located adjacent the hydrogenous scintillating layer, wherein at least one gamma ray is emitted from the neutron capture layer upon capture of the neutron;
   detecting at least one capture photon with the photon detection device to form a capture signal, wherein the capture photon is generated through an interaction of the at least one gamma ray with electrons in the hydrogenous scintillating layer; and
   determining that a neutron has been captured when the kinetic energy signal and the capture signal occur within a predetermined time period.

21. A method as in claim 20, further comprising determining that a neutron has been captured when the kinetic energy signal and the capture signal occur within a time period of less than about 40 microseconds.

22. A method as in claim 20, further comprising determining a kinetic energy of the neutron prior to its interaction with the hydrogenous scintillating layer via a number of collision photons detected at the photon detection device.

23. A heterogeneous capture-gated neutron detector, comprising:
   a scintillating detection means configured to emit at least one collision photon when contacted with a neutron having an energy greater than a predetermined value;
   a neutron capture means configured to capture the neutron and emit at least one gamma ray; and
   the scintillating detection means further configured to emit at least one capture photon in response to the at least one gamma ray from the neutron capture layer.

24. The detector of claim 23, wherein the scintillating detection means is configured to emit at least one capture photon in response to the at least one gamma ray from the neutron capture layer when the neutron has an insufficient energy to produce the at least one collision photon to enable neutron flux to be measured for the neutrons having the insufficient energy.

* * * * *